US009292767B2

(12) United States Patent
Oberg et al.

(10) Patent No.: US 9,292,767 B2
(45) Date of Patent: Mar. 22, 2016

(54) DECISION TREE COMPUTATION IN HARDWARE UTILIZING A PHYSICALLY DISTINCT INTEGRATED CIRCUIT WITH ON-CHIP MEMORY AND A REORDERING OF DATA TO BE GROUPED

(75) Inventors: Jason Oberg, San Diego, CA (US); Ken Eguro, Seattle, WA (US); Victor Tirva, Mountain View, CA (US); Padma Parthasarathy, Fremont, CA (US); Susan Carrie, Mouttain View, WA (US); Alessandro Forin, Bellevue, WA (US); Jonathan Chow, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 270 days.

(21) Appl. No.: 13/344,473

(22) Filed: Jan. 5, 2012

(65) Prior Publication Data

US 2013/0179377 A1 Jul. 11, 2013

(51) Int. Cl.
*G06F 17/00* (2006.01)
*G06K 9/62* (2006.01)
*G06K 9/00* (2006.01)
*G06N 5/04* (2006.01)
*G06N 99/00* (2010.01)

(52) U.S. Cl.
CPC .......... *G06K 9/6282* (2013.01); *G06K 9/00986* (2013.01); *G06N 5/04* (2013.01); *G06N 99/005* (2013.01)

(58) Field of Classification Search
CPC .............................. G06N 99/005; G06N 5/04
USPC .............................................................. 706/45
See application file for complete search history.

(56) References Cited

U.S. PATENT DOCUMENTS

| 5,581,634 | A | * | 12/1996 | Heide ........................... 382/226 |
| 2010/0197390 | A1 | | 8/2010 | Craig et al. |
| 2010/0303289 | A1 | | 12/2010 | Polzin et al. |
| 2011/0058709 | A1 | | 3/2011 | Kipman et al. |
| 2011/0085705 | A1 | | 4/2011 | Izadi et al. |
| 2011/0228976 | A1 | | 9/2011 | Fitzgibbon et al. |

(Continued)

OTHER PUBLICATIONS

Andrews et al., Xbox 360 System Architecture, IEEE, 2006.*

(Continued)

*Primary Examiner* — Stanley K Hill
*Assistant Examiner* — Robert H Bejcek, II
(74) *Attorney, Agent, or Firm* — Gregg Wisdom; Judy Yee; Micky Minhas

(57) ABSTRACT

A computing device for use in decision tree computation is provided. The computing device may include a software program executed by a processor using portions of memory of the computing device, the software program being configured to receive user input from a user input device associated with the computing device, and in response, to perform a decision tree task. The computing device may further include a decision tree computation device implemented in hardware as a logic circuit distinct from the processor, and which is linked to the processor by a communications interface. The decision tree computation device may be configured to receive an instruction to perform a decision tree computation associated with the decision tree task from the software program, process the instruction, and return a result to the software program via the communication interface.

14 Claims, 7 Drawing Sheets

(56) References Cited

U.S. PATENT DOCUMENTS

| | | |
|---|---|---|
| 2012/0309532 A1 | 12/2012 | Ambrus et al. |
| 2013/0179377 A1 | 7/2013 | Oberg et al. |
| 2013/0335318 A1 | 12/2013 | Nagel et al. |

OTHER PUBLICATIONS

McGrath, Kinect's BOM Roughly $56 Teardown Finds, EE Times News & Analysis, Nov. 11, 2010.*

Narayanan, et al., An FPGA Implementation of Decision Tree Classification, Design, Automation & Test in Europe Conference & Exhibition, Apr. 16-20, 2007.*

The Teardown: The Kinect for Xbox 360, Engineering & Technology, Apr. 2011.*

Kinect User's Manual, 2010.*

Pogue, Kinect Pushes Users Into a Sweaty New Dimension, NY Times, Nov. 4, 2010.*

Jessel, David. AMD Operton TM Processors: A Better High-End Embedded Solution, pp. 7, Mar. 2005.*

Becker et alia. Hardware-Accelerated Object Tracking. Computer Vision on Low-Power Reconfigurable Architectures Workship, Field Programmable Logic and Applications (FPL), 2011.*

Shotton, et al., "Real-Time Human Pose Recognition in Parts from Single Depth Images", Retrieved at <<http://www.stat.osu.edu/~dmsl/BodyPartRecognition.pdf>>, Proceedings of the 24th IEEE Conference on Computer Vision and Pattern Recognition (CVPR), Jun. 25, 2011, pp. 8.

Becker, et al., "Hardware-Accelerated Object Tracking", Retrieved at <<http://www.doc.ic.ac.uk/~tbecker/papers/fp111.pdf>>, Computer Vision on Low-Power Reconfigurable Architectures Workshop, Field Programmable Logic and Applications, 2011, pp. 2.

Odermatt, Roger, "Improving Action Classifiers with Depth", Retrieved at <<http://www.vision.ee.ethz.ch/teaching/sada/sadalink/reports/2011/397/report.pdf>>, Jul. 29, 2011, pp. 37.

Osman, "Random Forest-LNS Architecture and Vision", Proceedings of the IEEE International Conference on Industrial Informatics, Jun. 2009, 6 pages.

Pittman, et al., "Image Segmentation Using Hardware Forest Classifiers", Proceedings of the IEEE International Symposium on Field-Programmable Custom Computing Machines, Apr. 2013, 8 pages.

Shotton, et al, "Efficient Human Pose Estimation from Single Depth Images", In Proceedings of the IEEE Computer Vision and Pattern Recognition Conference, Jun. 2011, 21 pages.

Criminisi, A. et al., "Decision Forests: A Unified Framework for Classification, Regression, Density Estimation, Manifold Learning and Semi-Supervised Learning", Foundations and Trends in Computer Graphics and Vision: vol. 7: No. 2-3, Jan. 2011, 150 pages.

ISA European Patent Office, International Search Report and Written Opinion Issued in Application No. PCT/US2015/037307, Sep. 14, 2015, WIPO, 11 pages.

Sharp, T., "Implementing Decision Trees and Forests on a GPU", In Proceedings of 10th European Conference on Computer Vision, Computer Vision—ECCV 2008, Oct. 2008, 14 pages.

* cited by examiner

DECISION TREE COMPUTATION IN HARDWARE UTILIZING A PHYSICALLY DISTINCT INTEGRATED CIRCUIT WITH ON-CHIP MEMORY AND A REORDERING OF DATA TO BE GROUPED

BACKGROUND

Decisions trees are used in a wide variety of software applications. For example, image processing programs, speech recognition programs, and search engines use decision trees to make probabilistic determinations of a class or characteristic of a data element. One type of decision tree, referred to as a binary decision tree, is formed in a branching tree structure, with an origin node branching to two child nodes, with some of the child nodes optionally functioning as parent nodes and branching in turn to two more child nodes, etc. Terminating nodes without child nodes are referred to as leaf nodes, while nodes that branch to child nodes are referred to as branch nodes.

The decision tree is traversed from top to bottom. Each branch node includes a classifier function, also referred to as a node descriptor, according to which the input data under analysis is evaluated to determine whether to branch right or left when proceeding down the tree structure. Thus, beginning at the origin, and proceeding until a leaf node is reached, at each branch node, the input data is evaluated by the classifier for the branch node, and traverses to the appropriate child node. Each leaf node represents a data class or characteristic, and also typically has assigned to it a probability of certainty that the input data is of the same class or characteristic as the leaf node. By traversing the decision tree from the origin node to a leaf node, a probabilistic determination of a class or characteristic of the input data can be made.

To date, evaluation of decision trees has been performed in software, which offers rapid prototyping and development times, flexible updating, etc. However, decision tree algorithms in software have been pushed to their limit by recent applications, such as in the computer gaming arts. For example, recently body part recognition software using decision tree analysis has been developed which can, in real time, evaluate incoming depth images from a depth camera input of a game console, to identify body parts of a moving image of a user. The output of the decision tree is used to perform skeletal modeling of the user, such that the user can interact with the game console in a three dimensional interaction space without holding a handheld controller.

However, such real-time, high throughput software-based decision tree algorithms consume significant power, and thus generate significant heat. They also are operating near their limit in terms of keeping up with the incoming images, and thus face difficulties if challenged by developers with a higher pixel count per image or an increasingly complex decision tree. Further, access to memory not in cache can create bandwidth bottlenecks and access-wait-time slowdowns in these software based algorithms. Finally, processor time devoted to classifying decision trees cannot be devoted to other internal processes of the game controller. As a result, increasing the speed while reducing the power consumption, heat, and cost of such real time software based decision tree evaluation of large data sets, remains a significant challenge.

SUMMARY

A computing device for use in decision tree computation is provided. The computing device may include a processor in communication with memory and mass storage via a communications interface. The computing device may further include a software program stored in the mass storage device and executed by the processor using portions of the memory, the software program being configured to receive user input from a user input device associated with the computing device, and in response to perform a decision tree task. The computing device may further include a decision tree computation device implemented in hardware as a logic circuit distinct from the processor. The decision tree computation device is linked to the processor by the communications interface, and is configured to receive an instruction to perform a decision tree computation associated with the decision tree task from the software program, process the instruction, and return a result to the software program via the communication interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In order to address the challenges identified above, a system utilizing decision trees is described herein that at least partially traverses the decision trees using dedicated hardware. The system may be configured to generate increased efficiency over pure software decision tree traversal algorithms executed on a general purpose processor. For example, the dedicated hardware for traversing the decision trees may run at a slower clock speed than a comparable software-based implementation on a general purpose processor, potentially reducing power consumption, heat generation, and/or production costs, as well as increasing performance per unit of power consumption. Alternatively, the clock speed might be similar, but the greater efficiency of the dedicated hardware can complete the task in a much shorter amount of time. This again leads to lower power consumption, and additionally provides software with a larger execution window e.g. more time in between input images during which to perform other tasks.

Figure 1:
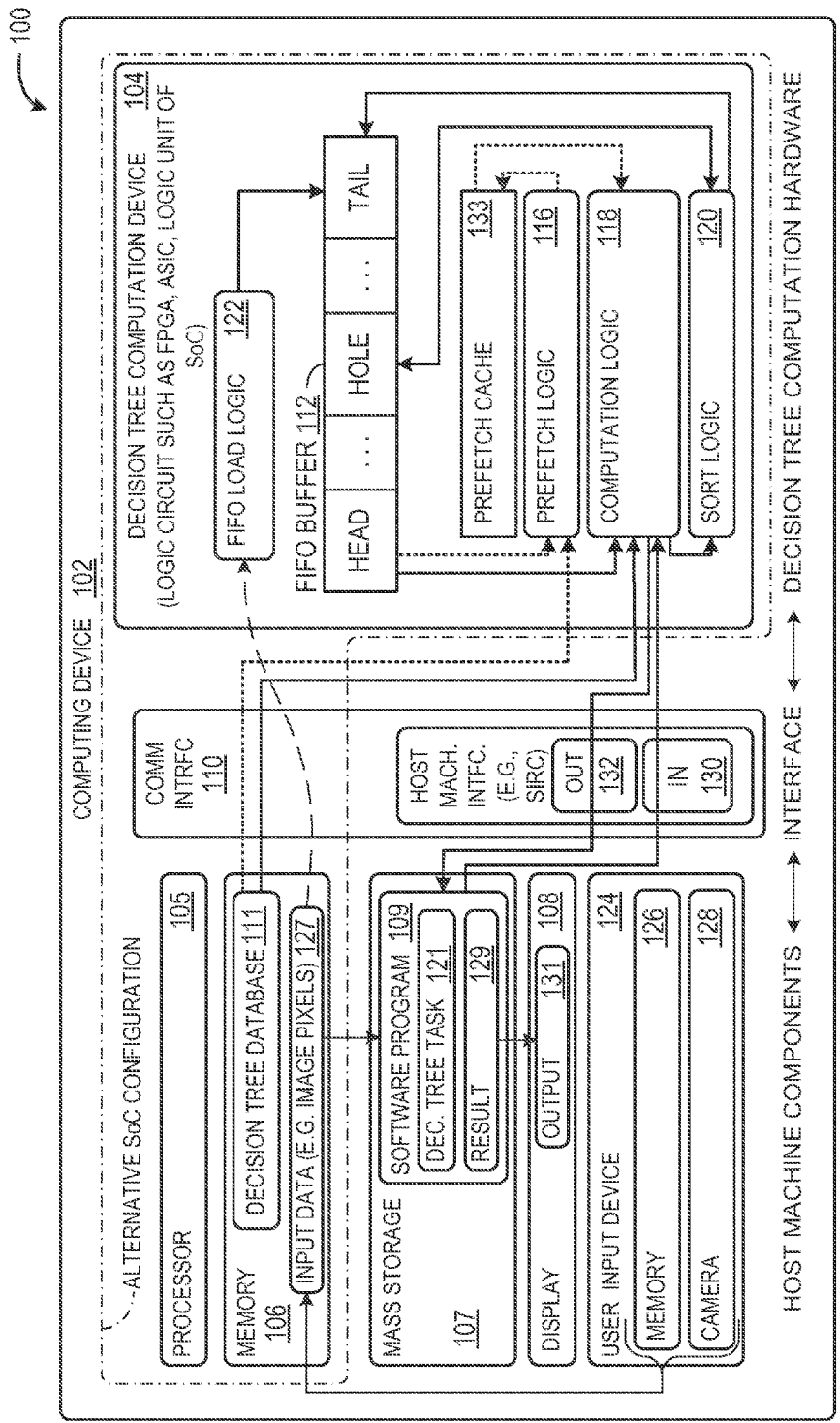
FIG. 1 schematically shows an embodiment of a system configured to traverse decision trees in hardware.

FIG. 1 schematically shows an embodiment of a decision tree computation system 100, which includes a computing device 102 for use in decision tree computation. The computing device 102 may include a processor 105 in communication with memory 106 and mass storage 107 via a communications interface 110. The computing device 102 may further include a software program 109 stored in the mass storage 107 and executed by the processor 105 using portions of the memory 106. The software program 109 may be configured to receive user input from a user input device 124 associated with the computing device 102, and to perform a decision tree task 121 in response.

The user input may be in various forms, including image information from a camera 128, which may be directly streamed from the camera, or temporarily stored in an onboard memory 126 of the user input device 124 and fetched by or otherwise transmitted to the software program 109. In FIG. 1, the user input is shown being stored as input data 127 in memory 106, and then transmitted to software program 109. As described below in reference to FIGS. 5 and 6, in one embodiment, the computing device may be configured as a game console and the user input device may be a depth camera configured to receive depth images, which are in turn processed by decision tree processing implemented at least partially by decision tree computation device 104. Thus, the input data 127 may include images, such as depth images, comprised of a plurality of pixels. Each pixel has an X, Y coordinate position within the image to which it belongs. The pixels of depth images contain depth information indicating a camera to object depth as measured for the pixel, as described below.

The computing device 102 may further include a decision tree computation device 104 implemented in hardware as a logic circuit distinct from the processor 105, which is linked to the processor 105 by the communications interface 110. The decision tree computation device 104 is configured to receive an instruction to perform a decision tree computation associated with the decision tree task 121 from the software program 109, process the instruction, and return a result 129 to the software program via the communication interface. The decision tree computation takes as input the input data, such as these depth images from the depth camera, which are loaded from memory 106 into the FIFO buffer 112 of the decision tree computation device for processing, as described below. The decision tree computation also takes as input the decision tree database data 111, which contains the decision tree itself, including node descriptors for each node in the tree. The decision tree data may be loaded into the prefetch cache 133 for processing at the decision tree computation device 104.

The hardware in which the decision tree computation device 104 is implemented may be an integrated circuit such as a programmable logic device (PLD) or application specific integrated circuit (ASIC). The integrated circuit is logically separated from the processor 105 and includes on-chip memory formed separate from the memory 106 of the computing device 102. A field programmable gate array (FPGA) and complex programmable logic device (CPLD) are two examples of suitable PLDs that may be used to implement decision tree computation device 104. Further, in another embodiment illustrated by a dash-dot line in FIG. 1, the decision tree computation device 104 may be implemented as a system-on-chip ("SoC"). In a SoC implementation, typically the processor 105, memory 106, and decision tree computation device 104, are formed as separate logic units within a single SoC integrated circuit, and the communication interface 110 includes an on-chip communications interface subsystem to enable communication between these separate logic units.

In some embodiments, the on-chip memory further includes a FIFO buffer 112, and the decision tree computation device 102 is further configured to, in response to receiving the instruction to perform the decision tree computation, load the FIFO buffer 112 with decision tree data from the decision tree database 111 in memory 106 (e.g. DDR memory) of the computing device 102, for subsequent access and processing by on-chip computation logic 118. To accomplish this, FIFO buffer 112 includes associated FIFO load logic 122 configured to load data into FIFO buffer 112 in a first in, first out manner. As shown, FIFO buffer 112 comprises "head", "hole", and "tail" identifiers, which will be described in greater detail below. Other logic included within decision tree computation device 104 includes but is not limited to, prefetch logic 116, and/or sort logic 120, which function as described below.

Input device 124 may comprise, for example, memory 126 and/or camera 128. In other embodiments, input device 124 may comprise other on-board sensors, cameras, and/or processors. As illustrated, input device 124 may be configured to provide data (e.g., depth images) directly to decision tree computation device 104 via FIFO load logic 122, or the data may be first transmitted to and stored in memory 106 of computing device 102, for later retrieval by the FIFO load logic, according to the instructions of software program 109.

Communications interface 110 refers generally to one or more communications subsystems provided to enable communications among the various host machine components, and between the host machine components and the decision tree support components. Thus, it will be understood that communication interface 110 may comprise one or more discrete I/O paths, each potentially utilizing separate protocols, encodings, and/or physical interfaces. For example, computing device 102 may communicate with input device 124 via USB and with decision tree computation device 104 via Ethernet or a high speed data bus. Furthermore, computing device 102 may be configured to utilize one or more host machine interfaces, which may be a type of application programming interface (API) that enables application programs such as software program 109 to access hardware resources such as device 104 using a standardized instruction set and protocol. In the illustrated embodiment one example host machine interface is illustrated as the Simple Interface for Reconfigurable Computing ("SIRC"). Through SIRC, a single in-point 130 for inbound communications to the decision tree computing device 104 and a single out-point 132 for outbound communications from the decision tree computing device are provided for programs such as software program 109. While SIRC is a software construct, it enables communications with hardware resources such as device 104 over a hardware communications bus of communications interface 110. It will be appreciated that SIRC is merely one example technology that may be used as a host machine interface. Many other alternative implementations of host machine interfaces will be apparent to one of ordinary skill in the art.

The decision tree computation device 104 is configured to process the data it receives using hardware-based decision tree evaluation processes. In order to increase throughput, decision tree computation device 104 may utilize a prefetch logic 116 to implement a "pipelined" execution workflow. For example, prefetch logic 116 may be configured to retrieve information from decision tree database 111 and/or FIFO buffer 112. Thus, the on-chip memory of decision tree computation device 104 may include a prefetch cache 133, and the decision tree computation device may be configured to prefetch decision tree database data from the decision tree database 111 in memory 106 of the computing device 102, and store it in the prefetch cache 133 of the on-chip memory of the decision tree computation device 104. Information retrieved from database 111 (such as a decision tree data structure including nodes, node descriptors, etc.) may be used, for example, to evaluate the data at a given node via computation logic 118.

In some embodiments, FIFO buffer 112 may be divided into separate FIFOs with prefetch logic 116 in between. Such a configuration may allow prefetch logic 116 to access FIFO buffer 112 without requiring additional read ports of FIFO buffer 112. Use of multiple FIFO buffers may further increase the parallelism of decision tree computation device 104, since individual FIFOs may be accessed concurrently and independently during decision tree computation.

Furthermore, sort logic 120 may be provided and configured to sort the contents of FIFO buffer 112 such that all related data is located in consecutive FIFO entries. Locating all related entries of FIFO buffer 112 contiguously and in predictable locations, may allow the associated entries to be efficiently read and/or written. Further description of such sorting and processing is provided with reference to FIGS. 2A-4, below. As described above, the result 129 of the computation of the decision tree by the computation logic 118 acting on the sorted FIFO buffer, which is kept full by the prefetch load logic and prefetch cache, is returned to the software program 109 via the out-point 132 of the host machine interface of the communications interface 110.

Computing device 102 may further include a display 108. The software program 109 is further configured to display output 131 on the display 108 associated with the computing device 102, based directly or indirectly on the result 129 received from the decision tree computation device 104. For example, output 131 that is displayed on the display 108 may be a graphical representation of a user in a virtual interaction space based on skeletal modeling of the user performed as described below with reference to FIGS. 5-6, and/or may be a graphical representation of a virtual interaction space that includes elements which are responsive to recognized natural input.

Figure 2A:
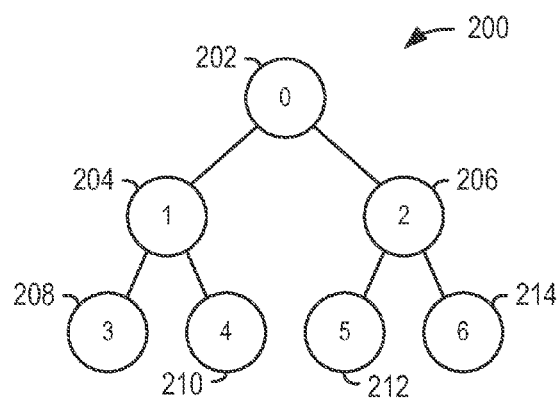
FIG. 2A shows an example of a decision tree in accordance with embodiments of the present disclosure.

Methods for traversing decision trees in hardware will now be described in greater detail in reference to FIGS. 2A-B. FIG. 2A shows an example of a decision tree 200 in accordance with embodiments of the present disclosure. Decision tree 200 comprises root node 202, also referred to as an origin node; branch nodes 204 and 206; and leaf nodes 208, 210, 212, and 214. As illustrated, all nodes of tree 200 which are not leaf nodes are associated with two child nodes. Beginning with the root node and traversing down the tree 200 until a leaf node is reached, input data is evaluated according to the node descriptor defined for each node, in order to determine to which child branch node to proceed. For example, an evaluation at 202 may result in continuation to branch node 204 or to branch node 206. As one specific illustration, in a computer imaging application evaluation at a branch node may include comparing a characteristic of a first pixel (subject) to a characteristic of a second pixel (defined relative to the subject pixel, e.g., the pixel to the right of the subject pixel) and then comparing that result to the node descriptor. For example, the depth difference between the two pixels may be ascertained and compared to a depth difference threshold defined by the current node descriptor. In this manner, edges of objects may be detected. As another example, the depth of the subject pixel may be compared to a maximum depth threshold. In this manner, objects that are located beyond the threshold may be labeled "background".

At leaf nodes 208, 210, 212, and 214, data is evaluated and the resulting evaluation ends traversal of the decision tree. Evaluation at leaf nodes (e.g., leaf nodes 208, 210, 212, and 214) may comprise applying a probability distribution to the data. That is, data reaching the leaf node is said to belong to a certain class or possess a certain characteristic associated with that leaf node, with an assigned probability for the accuracy of the classification. For each data item input, the decision tree may be traversed, and the resulting leaf node determination may be returned to the software program 109, for further downstream processing.

Figure 2B:
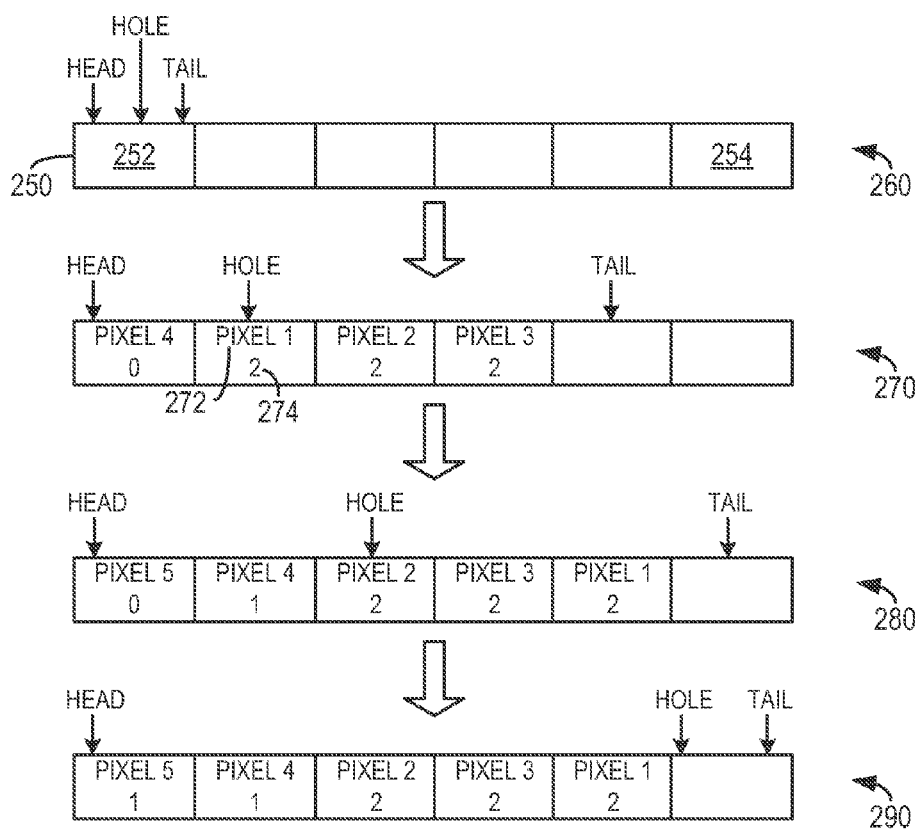
FIG. 2B shows a FIFO buffer during traversal of the decision tree of FIG. 2A.

FIG. 2B shows a FIFO buffer 250 during traversal of the decision tree of FIG. 2A. FIFO buffer 250 comprises a plurality of entries ranging from a first entry 252 to a last entry 254. Although illustrated as comprising 6 entries, it will be understood that FIFO buffer 250 may be of any length. At 260, FIFO buffer 250 is empty, and therefore first entry 252 is designated as the "head", "hole", and "tail". As used herein, "head" refers to the first FIFO entry, "hole" refers to the earliest FIFO entry associated with the highest-order node, and "tail" refers to the first available FIFO entry.

At 270, FIFO buffer 250 comprises the first 3 pixels of a dataset after evaluation of node 0 at 202, and a fourth pixel still to be evaluated at node 0. Each FIFO entry comprises a pixel 272 and a target node 274. As illustrated, pixels 1, 2 and 3 are now associated with node 2. In other words, each of pixels 1, 2, and 3 have been evaluated at node 0 202 such that the next evaluation of said pixels will occur at node 2 206. Pixel 4, on the other hand, has yet to be evaluated at node 0. Furthermore, the entry of pixel 1 is designated as the "hole" since the entry of pixel 1 comprises the earliest FIFO entry associated with the highest-order node (e.g., node 2).

At 280, FIFO buffer 250 comprises the first 4 pixels of a dataset after evaluation of node 0 at 202. As shown, pixel 4 has been evaluated at node zero, and is now associated with target node 1 204. As mentioned above, it may be desirable to sort the entries of FIFO buffer 250 such that all related entries (e.g., all entries related with the same target node) are located in consecutive FIFO entries. Accordingly, all associated entries of FIFO buffer 250 may be efficiently read and/or written. Due to this behavior, pixel 4, which is associated with node 1, has been inserted at the location identified as the "hole" at 270, but which is the head at 280, and pixel 2, which is associated with node 2, has been moved to the location identified as the "tail" at 270, and the tail at 280 is moved one location to the right. Accordingly, pixel 4, which is now associated with node 1, is located before the pixels now associated with node 2. A new pixel 5 associated with node 0 is loaded into the head location.

At 290, FIFO buffer 250 comprises all pixels after evaluation at node 0 202 of FIG. 2A. At this point, all entries in FIFO buffer 250 are ready to be evaluated by the following tree level (e.g., node 1 204 or node 2 206 of FIG. 2A). Therefore, any future evaluations of FIFO buffer 250 will result in each of the pixel entries being associated with higher-order nodes (e.g., nodes 3-6 of FIG. 2A). Accordingly, the first available FIFO (e.g., illustrated as last entry 254) is marked as both the "hole" and the "tail".

Future evaluations of FIFO buffer 250 (e.g., at node 3 208 or node 4 210 of FIG. 2A) will therefore result in data being read from an earlier location in FIFO buffer 250, evaluated, and then inserted at the "tail" (e.g., after data associated with node 2). Accordingly, in the simplest realization, FIFO buffer 250 may be sufficiently large to contain all entries for all nodes. However, in some embodiments, FIFO buffer 250 may utilize additional/different structures (e.g., circular buffer or other "wrap-around" structure) such that all associated data is located contiguously without requiring as large of a FIFO.

Figure 3A:
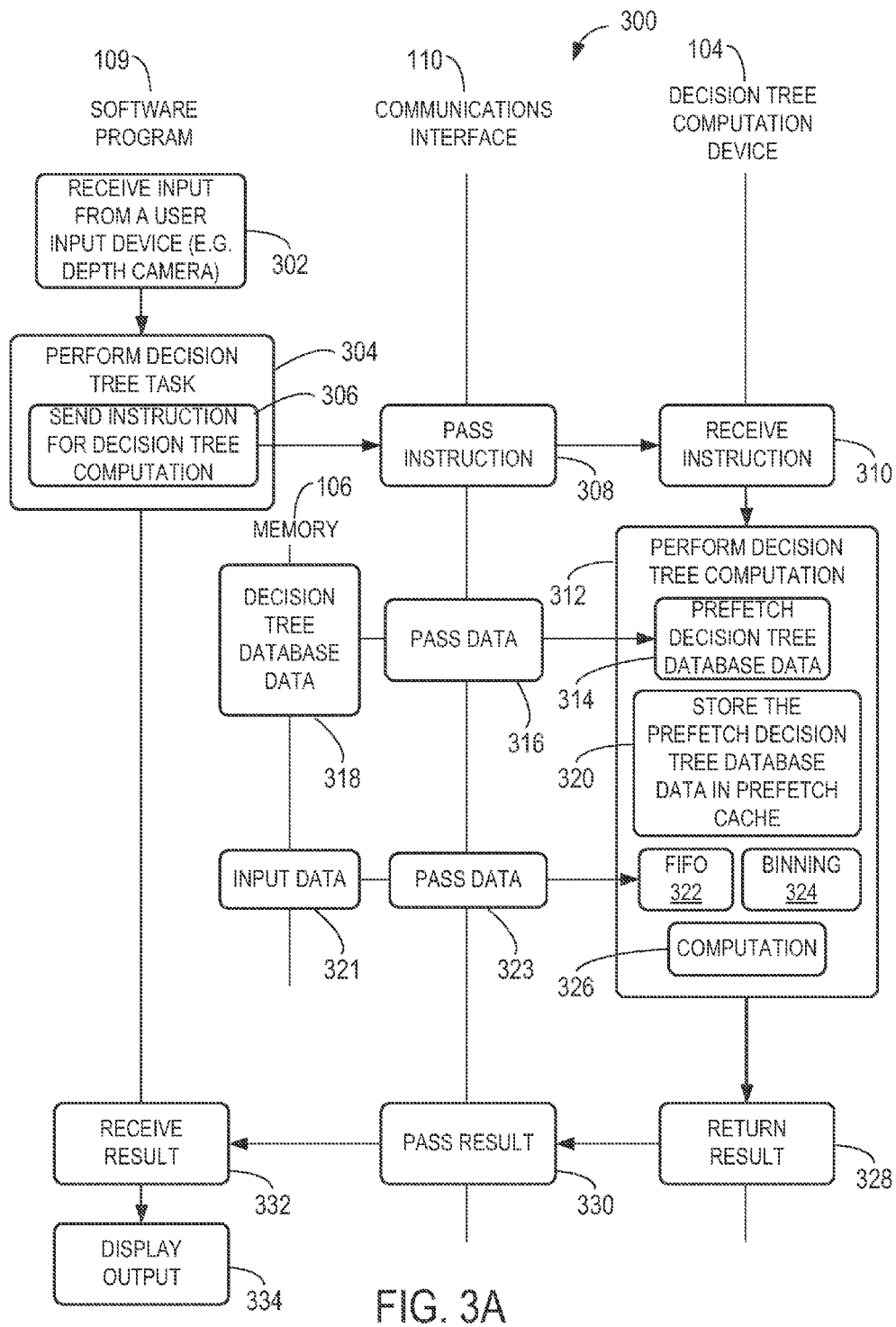
FIG. 3A shows a process flow of an embodiment of a method for use in decision tree computation according to one embodiment of the present disclosure.

FIG. 3A shows a process flow of an embodiment of a method 300 for use in decision tree computation according to one embodiment of the present invention. The method includes the following steps 302-306, as well as 328 and 330 implemented at a software program 109 executed on a processor 105 of computing device 102 using portions of memory 106 and mass storage 107. At 302, the method includes receiving user input from a user input device 124 associated with the computing device 102. At 304, the method includes, in response to the user input, performing a decision tree task 121. The performing of the decision tree task includes, at 306, sending an instruction from the software program to a decision tree computation device 104 implemented in hardware as a logic circuit distinct from the processor 105.

The method 300 further includes utilizing a communication interface 110 to pass communications back and forth at 308, 316, 323, and 330 between the resources of the host computing device, including software program 109 and memory 106, and the decision tree computation device 104, to enable the software program 109 to access the dedicated hardware for processing of the decision tree computation. Thus, at 308, the instruction for decision tree computation is passed via the communication interface 110 to the decision tree computation device 104. The communications interface 110 typically includes an API and a hardware communications interface over which the API is configured to communicate with decision tree computation device 104.

The method 300 further includes performing several processing steps at the decision tree computation device 104, in hardware. As discussed above, the hardware in which the decision tree computation device 104 is typically implemented as an integrated circuit formed separate from the processor on which the software program 109 is executed. The integrated circuit includes on-chip memory formed separately from the general purpose memory 106 of the processor 105 on which the software program 109 is executed. Various hardware devices, such as a FPGA or other PLD, ASIC, or SoC, etc. as described above, may be used for the decision tree computation device 104.

At 310, the method includes receiving the instruction from the software program 109, and at 312, performing a decision tree computation. Performing a decision tree computation at the decision tree computation device 104 may include various substeps. For example, at 314, the method may include prefetching decision tree database data from the memory 106 associated with the processor 105 of the computing device 102, the memory 106 having the decision tree database data pre-stored therein, as indicated at 318. At 320, the method may include storing the decision tree database data in a prefetch cache 133 of the on-chip memory of the decision tree computation device 104.

At 322, the method may include, in response to receiving the instruction to perform the decision tree computation, loading a FIFO buffer 112 of the decision tree computation device 104 with the input data 127 (e.g., input image data such as pixels) located in memory 106 of the computing device 102, as indicated at 321, for subsequent access and processing by on-chip computation logic 118. As an alternative, or in some cases in conjunction with the FIFO processing at 322, a binning process may be utilized, as indicated at 324. In such case, the method may include, at 324, in response to receiving the instruction to perform the decision tree computation, binning decision tree data loaded from the memory of the computing device 102 into an off-chip memory location in the memory 106 of the computing device 102 during processing of the decision tree data by the on-chip computation logic 118, for subsequent retrieval and processing.

At 328, the method includes returning the result 129 to the software program 109, via the communications interface 110, which passes the result to the software program at 330. At 332, the result is received by the software program 109. Finally, at 334, the method includes displaying output 131 on a display 108 associated with the computing device 102, based directly or indirectly on the result received from the decision tree computation device 104.

Figure 3B:
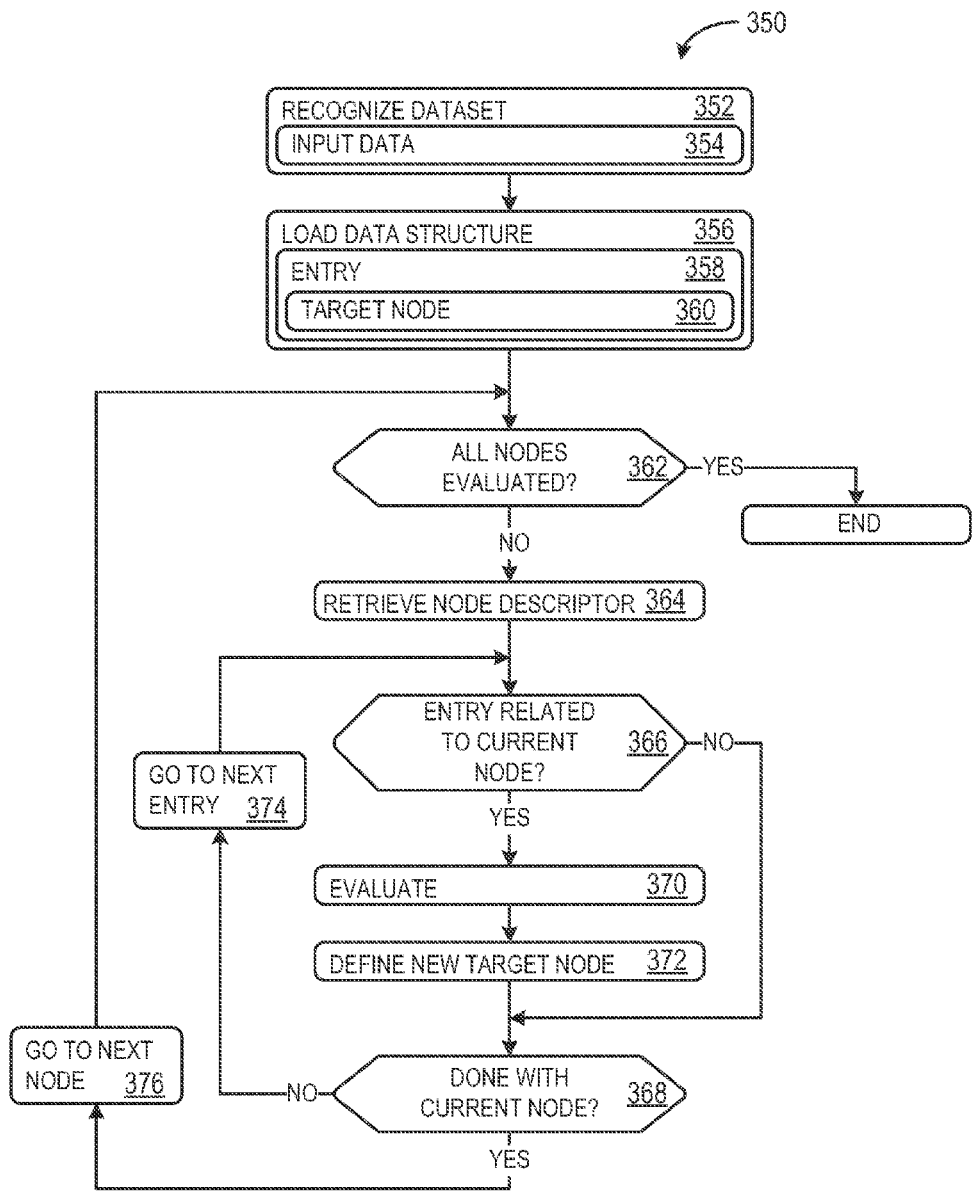
FIG. 3B shows a process flow of an embodiment of a method for traversing decision trees in a FIFO manner, in accordance with an embodiment of the present disclosure.

FIG. 3B shows a process flow of an embodiment of a method 350 for traversing decision trees in accordance with an embodiment of the present disclosure. At 352, method 350 comprises recognizing a dataset comprising a plurality of elements of input data 354. Input data 354 may include, for example, pixels of an image received from a camera (e.g., camera 128 of FIG. 1). In other embodiments, as described in reference to FIG. 1, input data 354 may be received via a computing device (e.g., computing device 102 of FIG. 1) connected to a camera (e.g., camera 128 of FIG. 1). It will be understood that, although not shown, method 350 may further comprise additional processing of input data 354 after being recognized at 354. Furthermore, in some embodiments, input data 354 may be processed by a separate device (e.g., input device 124 and/or computing device 102 of FIG. 1) before being recognized. Such processing (e.g., image segmentation) may identify a subset of input data 354 on which the remaining elements of method 350 are performed, thus potentially reducing time, power consumption, and/or complexity.

At 356, method 350 further comprises loading a data structure (e.g., FIFO buffer 250 of FIG. 2B). The data structure may include a plurality of entries 358, each comprising input data 354 received at 352 and a target node 360. Target node 360 defines the node at which the associated input data 354 is to be evaluated. Accordingly, during loading of the FIFO, all entries 358 are associated with the root node. The data structure may be configured such that all data associated with a given node is located in consecutive memory locations in order to facilitate efficient access of said data. It will be understood that the data structure may not be sorted after the initial load at 356 since all entries 358 are associated with the root node, and because the evaluation of data at a given node is order-independent (e.g., pixels A and B associated with the same node can be evaluated in any order).

At 352, method 350 comprises determining if all nodes have been evaluated. If all nodes have been evaluated (e.g., the entire decision tree has been traversed and all data has been evaluated at leaf nodes), method 350 ends. If, however, all nodes have not been evaluated, method 350 moves to 364.

At 364, method 350 comprises retrieving the node descriptor for the current node. The node descriptor may be retrieved, for example, from an external memory system (e.g., decision tree database 111 in memory 106 of FIG. 1). In other embodiments, the node descriptor may be retrieved from local (e.g., on-chip) storage. If the current node is a branch node, the descriptor may comprise data to which input data 354 is compared in order to determine a branching direction. If the current node is a leaf node, the descriptor may comprise data used to categorize the input data 354 (e.g., a class or characteristic, and an associated probability as described above).

It will be understood that, in accordance with an embodiment of the present disclosure, the node descriptor is retrieved once for each node and utilized for all entries 358 defining the current node as the target node 360. Accordingly, the descriptor data is only read once, and said read only occurs when the descriptor data is needed. Such a feature may be realized due to the sorting schema of the lookup structure (e.g., all associated input data 354 is located in contiguous locations). It will be further understood that the descriptor data is defined through modeling based on test data sets.

At 366, method 350 comprises determining if a particular entry is related to the current node. If the particular entry is not related to the current node, method 350 moves to 368. If, however, the entry is related to the current node, method 350 continues to 370 where the entry is evaluated at the current node. Evaluation may comprise, for example, comparing an input datum (e.g., a pixel) to a node descriptor (e.g., a maximum depth threshold). Various other node descriptors may be utilized, such as the relative contrast threshold for two pixels, relative depth threshold between two pixels, etc.

If the current node is a branch node, method 350 further comprises, at 372, defining a new target node. The target node defines the node at which the current entry will next be evaluated. If the current node is instead a leaf node, method 350 skips 372 and instead proceeds directly to 368. The decision procedure for a binary tree selects either the left-child or the right-child node.

At 372, method 350 comprises determining if all entries associated with the current node have been evaluated. If all entries have not been evaluated for the current node, method 350 continues to 374. At 374, method 350 moves to the next entry and method 350 continues evaluating the remaining entries at 366. If, however, all entries associated with the current node have been evaluated, method 350 continues to 376. At 376, method 350 comprises proceeding to the next node. In other words, all data is evaluated at a given node, and each node is evaluated in order (e.g., node 1 is evaluated after node 0 and node 2 is evaluated after node 1, etc.) until all data has been evaluated at a leaf node.

In addition to the sorting FIFO configuration described above, the traversal of decision trees may utilize other approaches, which will now be described in greater detail. In some embodiments, the traversal of the decision tree may not include evaluation at the leaf nodes. In such an embodiment, the dataset is iterated through the decision tree until reaching a leaf node. At this point, each datum is stored to memory along with an identifier (e.g., index) of its associated leaf node. A software layer such as software program 109 may then be configured to read the stored information and to apply the leaf node descriptor (e.g., probability distribution) accordingly. Such an embodiment may be utilized to reduce the amount of memory needed to store the descriptor data, or, if the amount of memory is constrained, to increase the memory headroom in anticipation of future algorithm updates.

In some embodiments, the decision tree (e.g., decision tree 250 of FIG. 2B) may comprise one root tree and one or more subtrees. Subtrees may be utilized, for example, due to memory constraints preventing the entire tree from residing in low-latency memory of the decision tree computation device 104. Each leaf node of the root tree may therefore be associated with the root node of one of the subtrees. Each such root tree leaf node will be referred to as "sub-leaf". Accordingly, data arriving at a sub-leaf node may be passed to the root node of the associated subtree. By dividing the tree into individual portions, each portion of the tree may be loaded from a higher-latency memory location to a lower-latency memory location, traversed, and then overwritten by the next tree portion. This may reduce the amount of low-latency memory needed, and thus possibly the component cost.

In some embodiments, it may be desirable to minimize the amount of on-chip RAM of the decision tree hardware (e.g., an FPGA) in order to reduce overall cost. Accordingly, a technique known as "binning" may be employed. In contrast to the sorting FIFO described above, binning relies on a plurality of locations ("bins") into which associated data can be inserted (e.g., sorted). Bins may comprise memory locations and/or data structures (e.g., buffers). The decision tree computation device 104 may be configured to perform binning of decision tree data previously loaded into on-chip memory from the memory 106 of the computing device 102, back into an off-chip memory location in the memory 106 of the computing device, in a binned manner, to make said offloaded data available for later retrieval.

Figure 4A:
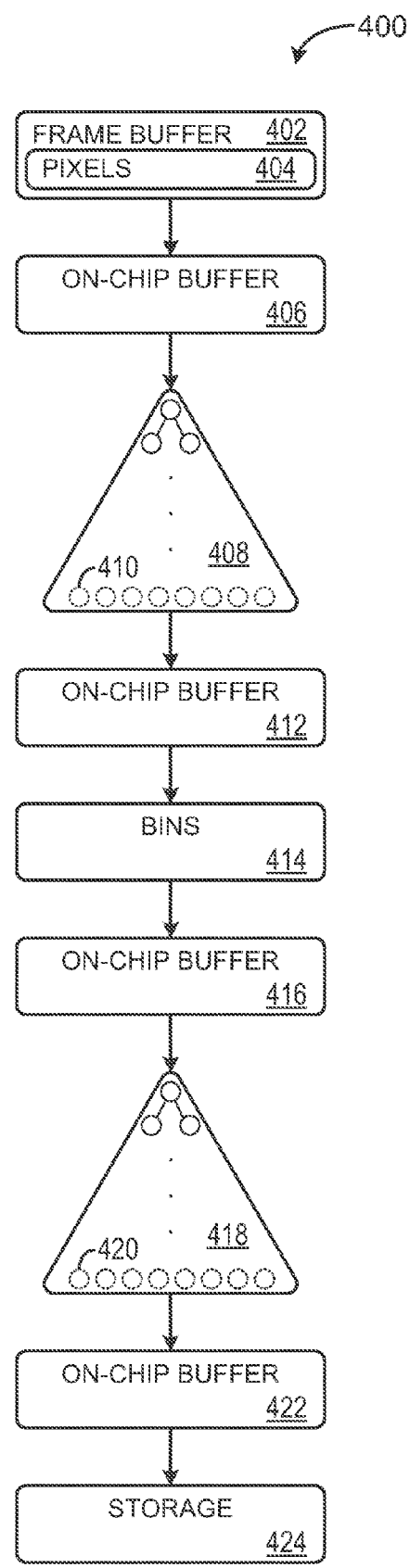
FIG. 4A shows an example process flow for traversing decision trees utilizing binning in accordance with an embodiment of the present disclosure.

Two embodiments utilizing "binning" will now be described in more detail. Both embodiments further utilize subtrees as described above. FIG. 4A shows an example dataflow 400 for traversing decision trees utilizing binning in accordance with an embodiment of the present disclosure. Dataflow 400 comprises a frame buffer 402 configured to buffer a plurality of pixels 404. Buffer 402 may be an element of an input imaging device (e.g., input device 124 of FIG. 1). In other embodiments, frame buffer 402 may be located within memory, either volatile or non-volatile, of a decision tree computation device (e.g., decision tree computation device 104 of FIG. 1). Pixels 404 are transferred from buffer 402 to on-chip buffer 406. It will be understood that "on-chip" refers to a location within the device packaging of the chip or chips that house the decision tree computation device 104.

Pixels 404 are then iterated through root tree 408, and thus reach one of sub-leafs 410 of root tree 408. Each pixel of pixels 404 is then written to on-chip buffer 412 along with any associated data resulting from traversal of tree 408 (e.g., one or more data identifying an associated sub-leaf 410). The contents of buffer 412 are then written to one of bins 414, which have been described above. In some embodiments, there may be individual buffers for each sub-leaf 410, and therefore no additional data beyond pixels 404 may be written to the buffers. In some embodiments, such as where a single buffer is used, buffers 406, 412, 416, and 422 may comprise a shared buffer and/or set of shared buffers.

Since all data written to the same location (e.g., one of bins 414) is associated with the same subtree and all data begins traversal of the associated subtree at the root node, the data stored in bins 414 does not include "next node" descriptors. Furthermore, pixels 404 may not need to be written, but rather an identifier of each of pixels 404 may be written. This identifier may then be used by one of the subtrees to access the associated data (e.g., one of pixels 404 stored in frame buffer 402). Such a configuration may reduce the amount of data to be written, thus increasing throughput.

Continuing with dataflow 400, pixels 404, and/or associated data as described above, are loaded into on-chip buffer 416. Pixels 404 are then iterated through one of subtrees 418, and thus reach one of leafs 420 of one of subtrees 418. Each pixel of pixels 404 is then written to on-chip buffer 422 along with any associated data resulting from traversal of tree 418 (e.g., one or more data identifying an associated leaf 420). In some embodiments, there may be individual buffers for each leaf 420, and therefore no additional data beyond pixels 404 may be written to the buffers. Dataflow 400 further comprises the contents of buffer 422 being written to storage 424 (e.g., higher-latency memory).

Since bins 414 may be simple memory locations that cannot be directly queried regarding how much data has been written, each bin 414 may be associated with a counter, hardware-based and/or software-based, configured to keep track of the amount of data written to bins 414. Once the root tree 408 has been traversed for all data and data has been stored in bins 414, each of the counters may be queried to determine if any data is associated with subtrees 418. If a given counter is non-zero (i.e., there is data associated with the subtree), data is then loaded into buffer 416 and iterated through one of subtrees 418.

After dataflow 400, the data in storage 424 may then be accessed (e.g., via a software layer) in order to classify said data (e.g., via application of a probability distribution). In other embodiments, the data of storage 424 may comprise one or more characterizing data (e.g., leaf identifier) based on the traversal of tree 408 and one of trees 418.

In addition to decreasing the amount of on-chip RAM needed, dataflow 400 may further increase read throughput due to the read-backs being consecutively spaced. However, such a configuration may also provide drawbacks. For example, root tree 408 and subtrees 418 are retrieved in its entirety before being traversed even if all nodes of the subtree are not going to be used. This contrasts with the sorting FIFO implementation which is configured to retrieve individual node descriptors as needed. Furthermore, each counter for each bin may require a dedicated memory location to store the counter value and/or associated counter hardware (if the counter is not software-based), thus increasing resource utilization.

In a second embodiment utilizing binning, a set of linked lists comprising one or more buffers and associated counters may be employed. Like the first binning embodiment, each datum traverses the root tree until reaching a sub-leaf. However, instead of writing the datum to a memory location associated with a particular subtree, one or more linked lists are queried for a buffer associated with subtree. If such a buffer exists, the datum is added into said buffer and an associated counter is updated. If no linked buffer has been instantiated yet for a given subtree, a new buffer is first allocated, added to the linked lists, and associated with the subtree. This ensures that no empty linked lists are allocated.

When a buffer is filled and is about to overflow, the contents are then written to memory along with a pointer identifying the next buffer of the same subtree, if applicable. In some embodiments, the same buffer for a given sub-tree can be re-used after writing the previous contents to memory. Due the finite size of the buffers, memory may be pre-allocated at the same time a buffer is allocated to ensure an available memory location exists in the event of an overflow.

Once the root tree is traversed for all data, all remaining buffers (i.e., buffers comprising data not previously written to memory) are written to memory. Since the remaining buffers are not completely filled, one or more data elements characterizing the occupancy of each buffer is written along with data itself. This data may include the size of the buffer and/or a single bit identifying whether the buffer is full or partial. This data may be written to the same field used to the store the next buffer location.

By utilizing buffers instead of memory locations as in the first binning embodiment, the second binning embodiment may utilize a smaller amount of memory, thus possibly reducing costs. However, the increased latency resulting from memory writes during buffer overflows and from querying the linked lists may in turn decrease overall throughput in some applications.

Figure 4B:
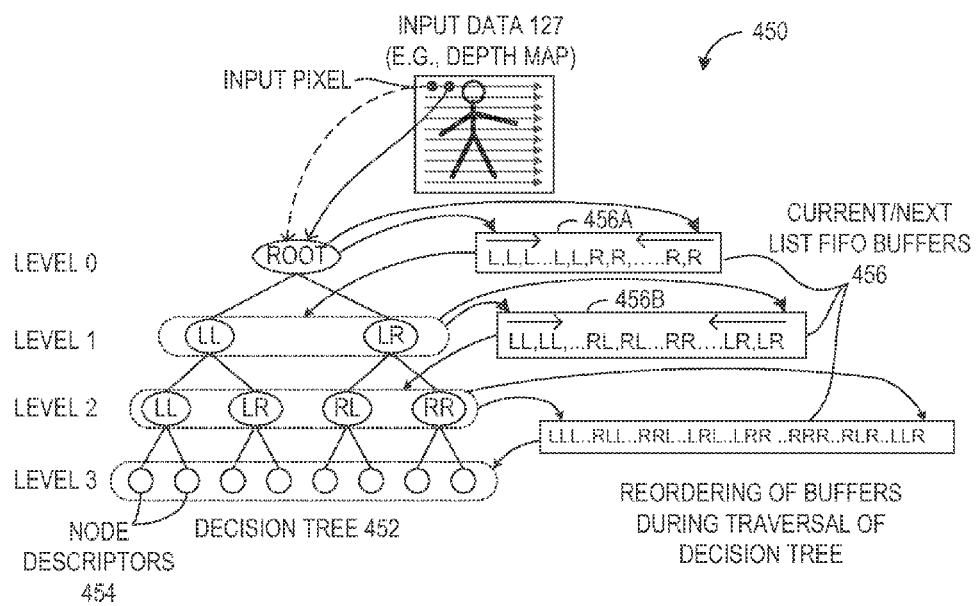
FIG. 4B illustrates an example process flow for traversing decision trees and reordering the input data to be grouped by node descriptor, at each level of the decision tree, in accordance with an embodiment of the present disclosure.

FIG. 4B illustrates another method 450 for traversal of a decision tree in hardware. The method 450 illustrated in FIG. 4B minimizes fetches to the node database by reordering the input data (e.g., pixels) to be grouped by node descriptor, at each level of the decision tree. Such a method is useful when the depth map and intermediate databases are kept on-chip and the node database is off-chip, which slows access times to the node database.

In method 450, the input image data (e.g., pixels) are sorted into a linear list based on the node address. All pixels that visit the same node appear grouped together in the sorted list. The list is then processed in the sorted order so that a node descriptor can be fetched once for all pixels at a given node. An example algorithm to accomplish this follows.

First, a current list is initialized that contains the following elements for every pixel to be classified: (1) X, Y coordinates of the pixel in the depth map, and (2) the node address of the pixel, which is set to ROOT to indicate the root of the tree. It will be appreciated that the X, Y address for each pixel is not illustrated in FIG. 4B; however, the node addresses are illustrated using the nomenclature L, LR, LRL, etc.

Once the current list initialized, for each level of the tree, the following steps are performed. A next list is initialized which is the same length as the current list, a left pointer is initialized to point to the beginning of the next list, and a right pointer is initialized to point to an end of the next list. For each pixel in the current list, the algorithm then determines whether the left or right branch of the tree is to be taken, and outputs a classification result, an example of which follows.

classification_result=classify_function(pixel_node_addr, pixel_x_y)

The algorithm then computes a new node address for the pixel from the left/right classification result and the current node address, an example of which follows.

new_node_addr=compute_node(pixel_node_addr, classification_result)

Next, the pixel is written into the next list, as follows.
if (classification_result==left) {*left_ptr++=(pixel_x_y, new_node_addr)}
if (classification_result==right) {*right_ptr--=(pixel_x_y, new_node_addr)}

Once all pixels are written into the next list, then the next list can be set to the current list and the process repeated for the next level of the tree, until no levels remain to be evaluated.

FIG. 4B illustrates how nodes with the same node address stay grouped together in the FIFO buffers. In FIG. 4B decision tree 452 includes a plurality of levels, each having node descriptors 454. Current list FIFO buffer and next list FIFO buffers are illustrated at 456, which the understanding that "current" and "next" are relative terms which indicate a current level of the tree being evaluated and a next level of the tree to be evaluated. Thus, when evaluating level 1, current list FIFO buffer is 456A and the next list FIFO buffer is 456B. Node addresses are identified by the prior branch decisions in the tree. For example, a pixel with a node address of RRL took the right branch at the root of the tree, the right branch at level 1 and the left branch at level 2.

At the first level of the tree all pixels are read from the depth map. If a pixel is valid it can be classified. Pixels which take the left branch are written starting at the left side (or bottom) of the FIFO buffer. Similarly, pixels which take the right branch are grouped together as they are written starting at the right side (or top) of the FIFO buffer.

At level 1 the FIFO buffer is read from left side of the FIFO buffer, classified, and then written to the left or right side of a second FIFO buffer (the next list). Thus, all pixels with a node address of 'L' are processed together. These are then sorted by writing pixels which branch to the left into the left side and those which branch to the right in from the right side of the FIFO buffer. Eventually, the pixels with a node address of 'R' are classified. Once this is done the pixels with the same node address will be grouped together in the second FIFO buffer, which corresponds to the next list described above.

At this stage, it will be appreciated that the memory which stores the 'L' and 'R' pixels is now free and can be used to store the results of the next level of classification which will produce pixels with node addresses 'LLL', 'RLL', 'RRL', 'LRL', 'LRR', 'RRR', 'RLR' and 'LLR'.

Several optimizations can be made to the system 100 to improve the performance and minimize power consumption using of the embodiment of FIG. 4B. First, the decision tree can be organized to reflect the FIFO order to maximize the same page address to memory (e.g., SDRAM). It will be appreciated that the decision tree is typically large and thus normally is stored in DDRx memory. This memory is more efficient in terms of bandwidth and power when successive accesses stay within the same page, typically defined as the same 2K block of memory. By ordering the node descriptors of the decision tree in the same way as the pixels in the FIFO buffers, this will maximize the number of "same page" accesses.

In addition, linked lists may be used to minimize memory consumption. Blocks of memory in the current list described above, are freed up as the FIFO buffer is processed. Thus, pointers to these freed up blocks can populate a buffer available list. The next list can then consume the buffers listed in the buffers available list. As a result, memory consumption for the FIFO buffers may be reduced by approximately half.

Further, instead of filling the lists from each end as described above, a separate FIFO buffer may be used for each node address. This may be accomplished without consuming significant blocks of memory by utilizing a list of pointers to free blocks of memory. The computation logic may then classify a pixel via node descriptors at two or more levels of the decision tree in the same round of processing.

With a design that enables traversal of more than one level of the tree for each pixel, the computation logic can read the pixel FIFO buffer once and store it in a local (on-chip) register or cache for the time it takes to classify the pixel at two levels (including all reads). Because the FIFO entries can be large, this can significantly reduce the bandwidth required to access on-chip memory.

As another modification, the node addresses for nodes at the top of the decision tree can be made smaller. Using a different data structure at the top of the decision tree which takes advantage of these smaller addresses will reduce the bandwidth required for FIFO accesses.

Further, it is possible to minimize internal memory usage by combining depth first and breadth first tree traversal. For example, suppose at level 1 the pixels with a node address of 'LL' are written to a FIFO buffer on chip and pixels with node addresses of 'RL', 'LR' and 'RR' are written off chip. This will cut the amount of on-chip memory utilized to about one fourth if the pixels are evenly distributed. The 'LL' pixels can then be fully classified down to the bottom levels of the tree. Subsequently, the 'RL' pixels can be moved on chip and classified down to the bottom level of the tree.

It will be appreciate the system of FIG. 1 may be configured to implement the method of FIG. 4B. Accordingly, computing device 102 may be configured to perform the decision tree computation in response to the decision tree task instruction, by retrieving a plurality of items of input data 127 from memory of the computing device, retrieving decision tree database data 111 including a decision tree having a plurality of node descriptors from the memory 106 of the computing device 102, initializing a current list containing the plurality of items input data 127, evaluating each item of input data 127 based on node descriptors at a current level in the decision tree, and reordering the evaluated input data to be grouped by node descriptor in a next list to be evaluated according to the node descriptors at a next level of the decision tree. In this manner, accesses from decision tree computation device 104 to off chip memory 106 may be minimized, saving bandwidth and reducing processing times.

Figure 5:
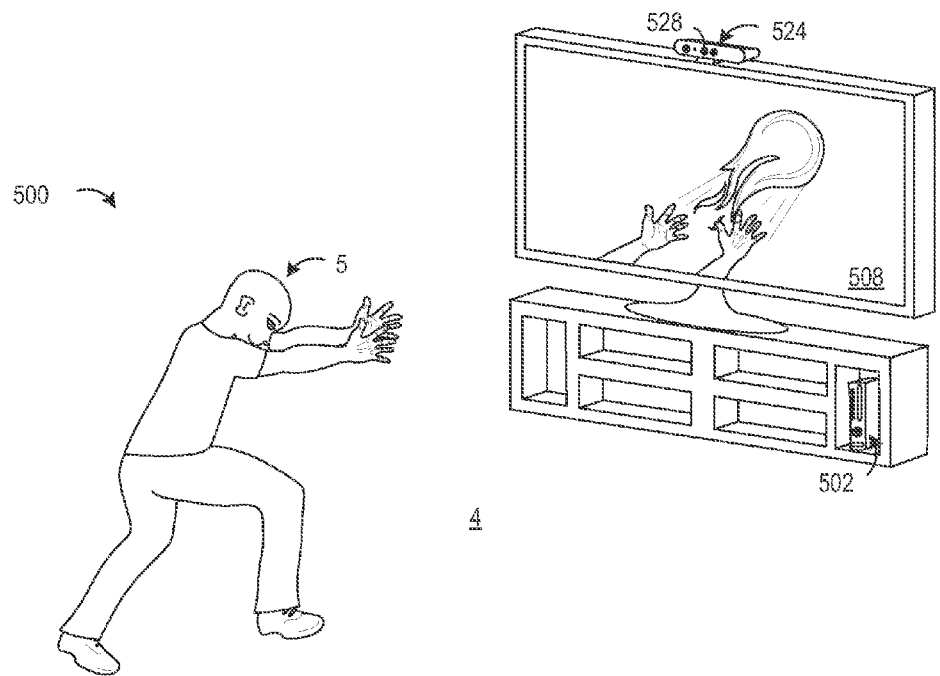
FIG. 5 shows an embodiment of system including a game console and depth camera, the system being configured to perform processing of depth images from the depth camera at least partially using decision tree computation in hardware.

FIG. 5 illustrates an exemplary embodiment of a system 500 in which the computing device 102 of system 100 described above is configured as a game console 502. The game console 502 has an associated display 508 and a user input device 524 equipped with a depth camera 528. In the illustrated embodiment the user input device 524 is formed in a separate housing and linked to the game console, for example, by a wired or wireless connection such as a USB connection. The depth camera is configured to capture a depth image of a real 3D interaction space 4 in which a user 5 may interact with the game console 502 by performing three dimensional movement of the user's body. Since the user may control the game console 502 directly with body movements, such user input is referred to as natural user input. It will be appreciated that the features of game console 502 are similar to those of computing device 102 described above, and therefore a detailed description of such similar features will be omitted for the sake of brevity.

Figure 6:
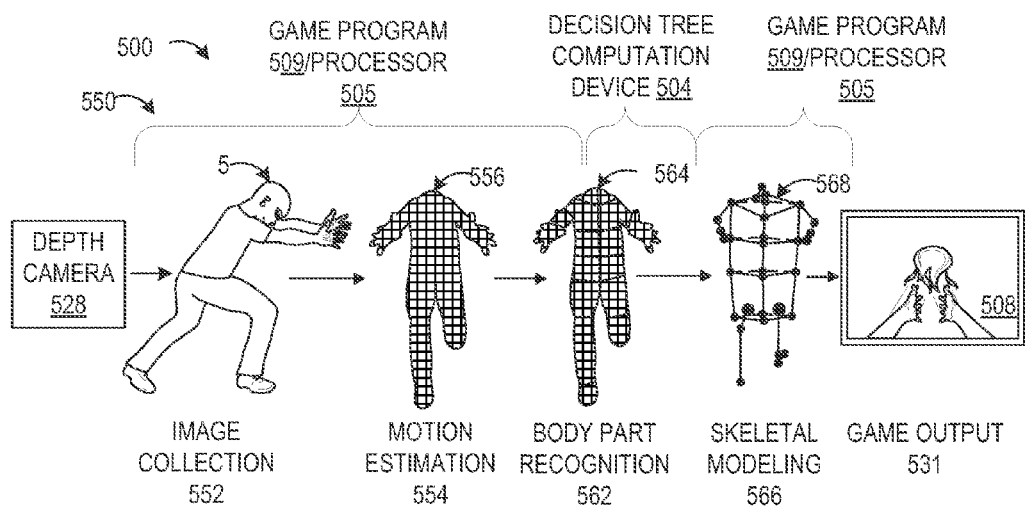
FIG. 6 shows an example of a processing pipeline of the system of FIG. 6, from captured image to graphical output, including a portion of the processing pipeline implemented in hardware.

FIG. 6 shows a simplified processing pipeline 550 in which user 5 in the 3D interaction space 4 is modeled as a virtual skeleton 568 that can serve as a control input for controlling various aspects of a software program such as game program 509 executed on processor 505 of game console 502 of system 500. FIG. 6 shows five stages of the processing pipeline 550: image collection 552 from depth camera 528, motion estimation 554, body part recognition 562, skeletal modeling 566, and game output 531 to display 508. It will be appreciated while much of this processing pipeline 550 is executed by game program 509 on processor 505 of the gaming console 502, a portion of this processing pipeline 550 may be implemented at the decision tree computation device 504 of the game console 502. In the illustrated embodiment, body part recognition 562 is accomplished by decision tree analysis that occurs at the decision tree computation device 504, while image collection 552, motion estimation 554 and skeletal modeling 566 occur at game program 509 on processor 505. It will be appreciated that the processing pipeline 550 may include additional steps and/or alternative steps than those depicted in FIG. 6 without departing from the scope of this disclosure. The processing pipeline 550 will now be described in greater detail below.

During image collection 552, user 5 and the rest of the 3D interaction space 4 may be imaged by a capture device such as depth camera 528. It will be appreciated that multiple users may be imaged concurrently in the 3D interaction space. The depth camera is used to track a position of each of a plurality of joints of a user (e.g., user 5). During image collection 552, the depth camera may determine, for each pixel, the depth of a surface in the observed scene relative to the depth camera. Virtually any depth finding technology may be used without departing from the scope of this disclosure. Example depth finding technologies are described below.

During motion estimation 554, the depth information determined for each pixel may be used to generate a depth map 556. It will be appreciated that each pixel includes associated depth information indicating a measured camera-toimaged-object depth. During motion estimation, each pixel in the depth images may be tagged with player information, enabling only those pixels for each player to be identified to produce a player-specific depth map 556, if desired. This information may be stored in a depth image buffer or other data structure that includes a depth value for each pixel of the observed scene, and also includes tagged player information. In FIG. 6, depth map 556 is schematically illustrated as a pixelated grid of the silhouette of user 5. This illustration is for simplicity of understanding, not technical accuracy. It is to be understood that a depth map generally includes depth information for all pixels, not just pixels that image the user 5. Depth mapping is typically performed by game program 509 executed by the processor 505 of the game console; however, in some embodiments specially configured processors (e.g., ASIC, PLD, SoC, etc.) may be included within the user input device 524 for this purpose.

The depth map 556 with player information is passed to game program 509, for body part recognition 562 of the specific body parts of each player within the depth map. The body part recognition 562 is accomplished by decision tree analysis using decision tree database data stored in memory 106 of the game console 502. In the illustrated embodiment the game program 509 sends an instruction to the decision tree computation device 504 to perform a decision tree computation for the purposes of body part recognition 562, and the decision tree computation device computes the decision tree computation according to the methods described above in relation to FIGS. 1-4. The result of the body part recognition is a depth map in which the pixels have further been tagged with body part recognition data, such as "head," "right arm," etc. This result of the decision tree computation is returned to the game program 509, which in turn performs downstream processing thereon. It will be appreciated that the instruction to perform the decision tree computation may be explicit or implicit. Thus, the body part recognition may be performed programmatically by the decision tree computation device upon detecting that data is available for analysis without an explicit message or instruction to do so from the game program 509.

During skeletal modeling 566, skeletal fitting algorithms are applied to the result of the body part recognition 562 received from the decision tree computation device 504, namely, the body-part-recognized depth map 556. In this manner a virtual skeleton 568 may be generated that fits to the labeled body parts of the depth map 556. The virtual skeleton 568 provides a machine readable representation of user 5 as observed by depth camera 528. The virtual skeleton 568 may include a plurality of joints, each joint corresponding to a portion of the user 5. Virtual skeletons 568 in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton 568 may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.). The position and motion of each joint in the virtual skeleton 568 within the interaction space 4 may be tracked over time by a skeletal tracking algorithm.

The game program 509 is configured display on the display 508 game output 531 including a graphical representation of the user 5 in the virtual interaction space 4 based on virtual skeleton 568 generated by skeletal modeling 566 of the user. In other embodiments, the game output 531 may include a graphical representation of a virtual interaction space that includes elements which are responsive to recognized natural input may be depicted. In this manner, a user may interact with a virtual GUI using recognized gestures for commands such as pressing buttons, manipulating sliders, pausing the game, etc.

Turning now to the computing environment in which the embodiments of the invention may be practiced, it will be appreciated that the computing device 102 of FIG. 1 and the game console of FIG. 5 are non-limiting examples of devices on which the embodiments may be practiced. The computing device 102 may take the form of a mainframe computer, server computer, desktop computer, laptop computer, tablet computer, home entertainment computer, network computing device, mobile computing device, mobile communication device, gaming device, etc. The computing device 102 may also optionally include user input devices such as keyboards, mice, game controllers, microphones, and/or touch screens, for example.

Processor 105 of computing device 102 may be, for example, a single core or multicore processor, and the programs that run on processor 105 may be configured for parallel processing. The processor 105 may also be distributed amongst several different computing machines, for distributed processing. Further, one or more aspects of the processor 105 may be virtualized and executed by remotely accessible networked computing devices configured in a cloud computing configuration.

Memory 106 is typically one or more physical devices configured as volatile memory to temporarily store data for a period of time in a non-transitory manner. As one example RAM may be used as memory 106. Mass storage 107 typically includes one or more physical devices configured as non-volatile memory to store data in a non-transitory manner, e.g., even when power is cut to the device. Examples of suitable mass storage devices include a magnetic storage device such as a hard drive, a non-volatile semiconductor storage device such as FLASH memory, and an optical storage device such as DVD-R. Typically, programs such as software program 109 are stored in a non-volatile manner in mass storage for execution on processor 105 using portions of memory 106, to implement the methods and processes described herein. In some embodiments, processor 105 and memory 106 may be integrated into one or more common devices, such as an ASIC or a SoC.

To provide for distribution of the software programs described herein, the system 100 may further include removable computer-readable storage media, which may be used to store and/or transfer data and/or instructions executable to implement the herein described methods and processes. Corresponding drives to read the computer-readable storage media may be provided on the computing device 102. The removable computer-readable storage media may take the form of CDs, DVDs, HD-DVDs, Blu-Ray Discs, EEPROMs, and/or floppy disks, among others.

It is to be appreciated that memory 106 and mass storage 107 includes one or more physical, non-transitory devices. In contrast, in some embodiments aspects of the instructions described herein may be propagated in a transitory fashion through a transmission medium by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "program" refers to software components of system 100 that are implemented to perform one or more particular functions. In some cases, such a program may be instantiated via processor 72 executing instructions held by memory 74. For ease of explanation, the diagrams may illustrate such software programs stored on mass storage and interacting with other hardware and software components; however, it will be appreciated that instantiated threads of the programs executed by the processor actually perform such actions. The term "program" is meant to encompass individual or groups of executable files, data files, libraries, drivers, scripts, database records, etc. The computing device may be configured to run an operating system, which enables access of the software programs to various hardware resources, for example via software constructs referred to as application program interfaces.

The depth camera 128 of user input device 124 may include left and right cameras of a stereoscopic vision system, for example. Time-resolved images from both cameras may be registered to each other and combined to yield depth-resolved video. In other embodiments, depth camera 128 may be a structured light depth camera configured to project a structured infrared illumination comprising numerous, discrete features (e.g., lines or dots). Depth camera 128 may be configured to image the structured illumination reflected from a scene onto which the structured illumination is projected. Based on the spacing between adjacent features in the various regions of the imaged scene, a depth image of the scene may be constructed.

In other embodiments, depth camera 128 may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernible from the relative amounts of light received in corresponding pixels of the two cameras.

In some embodiments, the user input device 124 may further include a visible light camera. Virtually any type of digital camera technology may be used without departing from the scope of this disclosure. As a non-limiting example, the visible light camera may include a charge coupled device image sensor.

Although the software program 109 has been described herein both generically as a software program and specifically as a gaming program, it will be appreciated that the software program 109 may alternatively be a speech recognition program, search engine program, image processing program, or other software program that performs decision tree processing, and thus the result of the decision tree computation task received from the decision tree computation device may be used by the software program in speech recognition, image processing, search query or other types of data processing. It will be appreciated that while the specific types of input data for these applications may be different from the depth image data of the embodiment of FIGS. 5 and 6, and the detailed design of the decision trees in these applications may also be different, the systems and methods described herein for processing the input data by evaluating the decision trees at least partially in hardware on decision tree computation device 102 may be effectively applied to decision tree analysis in these varied fields of endeavor without significant modification, since the fundamental processes for traversing the decision trees in each field is similar.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device for use in decision tree computation, comprising:
a processor;
a software program stored in a mass storage device and executed by the processor to perform a decision tree task; and
a decision tree computation device implemented in hardware as a logic circuit physically distinct from the processor, and which is linked to the processor by a communications interface, the decision tree computation device being configured to receive an instruction to perform a decision tree computation associated with the decision tree task from the software program, process the instruction, retrieve a plurality of items of input data and decision tree database data including a decision tree having a plurality of node descriptors, perform the decision tree computation by applying the decision tree to the plurality of items of input data, and return a result to the software program via the communications interface, wherein the hardware in which the decision tree computation device is implemented includes on-chip memory and is a field programmable gate array (FPGA), complex programmable logic device (CPLD), or application specific integrated circuit (ASIC), and wherein the computing device further includes off-chip memory in direct communication with the processor, the off-chip memory being physically distinct from the on-chip memory of the decision tree computation device; and
wherein, to perform the decision tree computation, the decision tree computation device is configured to retrieve the plurality of items of input data from the off-chip memory physically distinct from the hardware in which the decision tree computation device is implemented, retrieve decision tree database data including the decision tree having a plurality of node descriptors from the off-chip memory, initialize a current list containing the input data, evaluate each item of input data based on node descriptors at a current level in the decision tree, and reorder the evaluated input data to be grouped by node descriptor in a next list to be evaluated according to the node descriptors at a next level of the decision tree.

2. The computing device of claim 1, wherein the on-chip memory includes a prefetch cache, and the decision tree computation device is configured to prefetch decision tree database data from the off-chip memory physically distinct from the on-chip memory of the decision tree computation device, and store it in the prefetch cache of the on-chip memory.

3. The computing device of claim 2, wherein the on-chip memory further includes a FIFO buffer, and the decision tree computation device is further configured to, in response to receiving the instruction to perform the decision tree computation, load the FIFO buffer with input data in the off-chip memory, for subsequent access and processing by the decision tree computation device.

4. The computing device of claim 1, wherein the decision tree computation device is configured to perform binning of decision tree data loaded from off-chip memory physically distinct from the hardware in which the decision tree computation device is implemented.

5. The computing device of claim 1, wherein the software program is further configured to display output on a display associated with the computing device, based directly or indirectly on the result received from the decision tree computation device.

6. The computing device of claim 5, wherein the computing device is configured as a game console, the software program is configured to receive user input from a depth camera configured to capture depth image information as the user input, and the software program is configured to classify the depth image information via the decision tree computation task, based on the result received from the decision tree computation device.

7. The computing device of claim 6, wherein the software program is further configured to:
generate a depth map based on the captured depth image information, the depth map including a depth value for each pixel;
tag a plurality of pixels in the depth map with player information for a player; and
perform a decision tree task on the tagged plurality of pixels of the depth map for the player.

8. The computing device of claim 1, wherein the result of the decision tree computation task received from the decision tree computation device is used by the software program in speech recognition, image processing, or search query processing.

9. A method for use in decision tree computation, comprising:
at a software program stored in a mass storage device and executed by a processor:
receiving user input from a user input device associated with a computing device;
in response to the user input, performing a decision tree task, the performing of the decision tree task including sending an instruction from the software program to a decision tree computation device implemented in hardware as a logic circuit physically distinct from the processor;
at the decision tree computation device:
receiving the instruction from the software program;
retrieving a plurality of items of input data and decision tree database data including a decision tree having a plurality of node descriptors;
performing a decision tree computation by applying the decision tree to the plurality of items of input data; and
returning a result to the software program,
wherein the hardware in which the decision tree computation device is implemented is a field programmable gate array (FPGA), complex programmable logic device (CPLD), or application specific integrated circuit (ASIC), and includes on-chip memory physically distinct from off-chip memory that is in direct communication with the processor of the computing device;
wherein the instruction is sent from the software program to the decision tree computation device via a hardware communications interface; and
wherein performing the decision tree computation further comprises retrieving the plurality of items of input data from the off-chip memory physically distinct from the hardware in which the decision tree computation device is implemented, retrieving decision tree database data including the decision tree having a plurality of node descriptors from the off-chip memory, initializing a current list containing the input data, evaluating each item of input data based on node descriptors at a current level in the decision tree, and reordering the evaluated input data to be grouped by node descriptor in a next list to be evaluated according to the node descriptors at a next level of the decision tree.

10. The method of claim 9, wherein performing a decision tree computation at the decision tree computation device includes:
prefetching decision tree database data from the off-chip memory utilized by the processor of the computing device; and
storing the decision tree database data in a prefetch cache of the on-chip memory of the decision tree computing device.

11. The method of claim 10, wherein performing the decision tree computation at the decision tree computation device further includes:
in response to receiving the instruction to perform the decision tree computation, loading a FIFO buffer of the decision tree computation device with the decision tree data from the decision tree database in the off-chip memory for subsequent access and processing by the decision tree computation device.

12. The method of claim 10, wherein performing the decision tree computation at the decision tree computation device further includes:
in response to receiving the instruction to perform the decision tree computation, binning decision tree data loaded from the off-chip memory during processing of the decision tree data by the decision tree computation device for subsequent retrieval and processing.

13. The method of claim 9, further comprising:
displaying output on a display associated with the computing device, based directly or indirectly on the result received from the decision tree computation device.

14. A computing device for use in decision tree computation, comprising:
a processor;
a software program stored in a mass storage device and executed by the processor to perform a decision tree task; and
a decision tree computation device implemented in hardware as a logic circuit physically distinct from the processor, and which is linked to the processor by a communications interface, the decision tree computation device being configured to receive an instruction to perform a decision tree computation associated with the decision tree task from the software program, process the instruction, retrieve a plurality of items of input data and decision tree database data including a decision tree having a plurality of node descriptors, perform the decision tree computation by applying the decision tree to the plurality of items of input data, and return a result to the software program via the communications interface, wherein the hardware in which the decision tree computation device is implemented is a system-on-chip, and each of the processor and the decision tree computation device are separate logic units within the system-on-chip, and wherein the computing device further includes off-chip memory in direct communication with the processor, the off-chip memory being physically distinct from the on-chip memory of the decision tree computation device; and wherein, to perform the decision tree computation, the decision tree computation device is configured to retrieve the plurality of items of input data from the off-chip memory physically distinct from the hardware in which the decision tree computation device is implemented, retrieve decision tree database data including the decision tree having a plurality of node descriptors from the off-chip memory, initialize a current list containing the input data, evaluate each item of input data based on node descriptors at a current level in the decision tree, and reorder the evaluated input data to be grouped by node descriptor in a next list to be evaluated according to the node descriptors at a next level of the decision tree.

* * * * *